United States Patent [19]
Loeb et al.

[11] Patent Number: 6,006,205
[45] Date of Patent: Dec. 21, 1999

[54] CREDIT CARD BILLING METHOD AND SYSTEM

[75] Inventors: Michael R. Loeb, Darien; Jay S. Walker, Ridgefield, both of Conn.

[73] Assignee: Walker Asset Management Limited Partnership, Stamford, Conn.

[21] Appl. No.: 08/807,454

[22] Filed: Feb. 28, 1997

[51] Int. Cl.⁶ ..................................................... G06F 15/00
[52] U.S. Cl. ............................ 705/34; 705/30; 235/380; 235/375
[58] Field of Search ................................. 235/380, 375; 705/34, 30, 40

[56] References Cited

U.S. PATENT DOCUMENTS

| | | | |
|---|---|---|---|
| 5,173,594 | 12/1992 | McClure | 235/380 |
| 5,287,270 | 2/1994 | Hardy et al. | 705/34 |
| 5,310,997 | 5/1994 | Roach et al. | 235/375 |
| 5,325,290 | 6/1994 | Cauffman et al. | 705/34 |
| 5,477,040 | 12/1995 | Lalonde | 235/380 |
| 5,557,516 | 9/1996 | Hogan | 705/41 |
| 5,559,313 | 9/1996 | Claus et al. | 705/30 |
| 5,642,279 | 6/1997 | Bloomsberg | 705/14 |
| 5,753,899 | 5/1998 | Gomm et al. | 235/381 |

OTHER PUBLICATIONS

"UniComp Announces Completed Sale to Eagle Hardware and Garden Stores", Business Wire, Dec. 17, 1996.
Stanley J. Fenvessy, "Fenvessy on Fulfillment", DM News, Oct. 14, 1993 at p. 14.
Susan Crawford, "Cutting Down on Chargebacks; Mail Order Business", Catalog Age, Dec. 1992 at p. 97.
Carol Smith, "Executive Travel", Los Angeles Times, Sep. 28, 1995 at p. D4.
William Jackson, "Energy Lab Software Simplifies Buys Made with P–Cards", Government Computer News, Feb. 5, 1996 at p. 48.
Larry Schwartz, "Surviving the Chargeback Rule; Visa's International Rules on Credit Card Sales", Direct Marketing, Dec. 1991 at p. 23.
Ron Scherer, "Credit Card Battle Launched for 'Upscale' Clients", The Christian Science Monitor, Nov. 24, 1981 at p. 11.
"Bad Debt Hits China's Fledgling Credit Card Market", Reuters World Service, Jun. 16, 1995.

*Primary Examiner*—Allen R. MacDonald
*Assistant Examiner*—Jagdish Patel
*Attorney, Agent, or Firm*—Kurt M. Maschoff; Dean Alderucci

[57] ABSTRACT

An improved credit card billing method and system is disclosed which permits multiple items purchased as part of a single transaction or order to be separately billed on a credit card in accordance with a payment schedule designed to minimize inquiries regarding the overall order by the customer. The billing system permits the billing descriptor appearing on the credit card billing statement to have sufficient detail to minimize subsequent customer inquiries. The billing descriptor preferably includes a different customer service number for each individual item. Goods or services are purchased from a merchant in a conventional manner. The customer provides the merchant with a list of the multiple items included in the order, as well as credit card information. The merchant will preferably establish a staggered schedule for billing each individual item in the order and submit the charge requests to the credit card issuer in accordance with the established billing schedule.

18 Claims, 12 Drawing Sheets

| CREDIT CARD NUMBER 420 | CUSTOMER NAME 425 | CUSTOMER ADDRESS 430 | EXPIRATION DATE 435 | CREDIT LIMIT 440 |
|---|---|---|---|---|
| | | | | |
| | | | | |
| | | | | |
| | | | | |

FIG. 4

| DATE 520 | TIME 525 | CREDIT CARD NUMBER 530 | ORDER REF. NUMBER 535 | BILLING DESCRIPTOR 540 | MERCHANT ID 545 | PURCHASE AMOUNT 550 | AUTHORIZA-TION CODE 555 |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |

FIG. 5

| ORDER REF. NUMBER 620 | ORDER DATE 625 | CUSTOMER NAME 630 | CUSTOMER ADDRESS 635 | CREDIT CARD NUMBER 640 | EXPIRATION DATE 645 | AUTH. CODE 650 | PRODUCT DESCRIPTOR 655 | BILLING TERMS 660 | RENEWAL DATE 665 |
|---|---|---|---|---|---|---|---|---|---|
| | | | | | | | | | |
| | | | | | | | | | |
| | | | | | | | | | |
| | | | | | | | | | |

| SCHEDULED AUTH. DATE 720 | ORDER REF. NUMBER 725 | ORDER DATE 730 | CUSTOMER NAME 735 | CUSTOMER ADDRESS 740 | CREDIT CARD ACCOUNT NUMBER 745 | EXPIRATION DATE 750 | AMOUNT 755 | BILLING DESCRIPTOR 760 | AUTH. CODE 765 |
|---|---|---|---|---|---|---|---|---|---|
| ← 710 | | | | | | | | | |
| ← 711 | | | | | | | | | |
| ← 712 | | | | | | | | | |
| ← 713 | | | | | | | | | |

CREDIT CARD BILLING METHOD AND SYSTEM

FIELD OF THE INVENTION

The present invention relates generally to a credit card billing system used by retailers who sell goods or services, and more particularly, to an improved billing system which facilitates the placement of charges for such goods or services on a credit card billing statement in such a manner as to reduce the likelihood that the customer will request further information regarding the purchased goods or services.

BACKGROUND OF THE INVENTION

Direct marketing and other forms of remote retailing have become effective tools in the sale of many products and services. It has been found that direct marketing is particularly effective for selling certain types of products and services, including magazine subscriptions and membership services, as evidenced by the success of such direct marketing companies as NewSub Services and CUC International, each of Stamford, Conn.

Even when such remote retailers are initially successful in inducing a consumer to purchase certain goods and/or services, often at considerable expense, the remote nature of the transaction itself, including the time lapse between the purchase, delivery and billing events, tends to promote "second guessing" on the part of the consumer when the credit card billing statement finally arrives. Thus, many remote retailers experience a very high cancellation rate. Remote retailing of membership services, for example, can exhibit cancellation rates as high as fifty percent (50%) of total charges.

Consumers often purchase such goods or services with a limited understanding of the cost, or to obtain a free incentive being offered by the remote retailer to induce the purchase of the goods or services. Thus, when the charge for the purchased goods or services ultimately appears on the consumer's credit card billing statement, the consumer often questions the purchase.

When a charge is made to a credit card, remote retailers typically include a toll-free customer service telephone number, as part of the information printed on the credit card billing statement, together with the merchant name, a description of the goods purchased and the total cost of the goods. In this manner, inquiries about the charge may be directed to the appropriate merchant, as opposed to the credit card issuer, and the remote retailer may thereby have an opportunity to "save the sale." Upon receipt of the credit card billing statement, and seeing the total charge for the purchased goods or services, consumers will often "second guess" their initial purchase, and call the indicated customer service number to cancel the purchased goods or services.

The tendency of the consumer to "second guess" their initial purchase is often compounded by the consumer's unfamiliarity with the name of the remote retailer. In addition, this tendency is further compounded by the industry practice of aggregating all of the individual goods and services purchased at a single time for billing purposes and providing a generic description of the purchased goods and services, such as "magazines" or "membership services", with an aggregate amount for all of the purchased goods and services. For example, a consumer who orders an annual subscription to Time magazine and People magazine for $15 and $28, respectively, from NewSub Services, might see a total charge for $43 from NewSub Services labeled "Magazines" on the consumer's credit card billing statement.

Thus, the consumer's unfamiliarity with the name of the remote retailer, such as NewSub Services, may trigger a telephone call to the indicated customer service number, to investigate the source or particulars associated with the charge. In addition, because all of the purchased goods and services are grouped together for billing purposes, the larger total amount indicated on the credit card billing statement will receive additional scrutiny from the consumer. If a consumer purchases multiple cancelable items on a credit card, the aggregation of the cost of individual items into a total amount for billing purposes stimulates higher cancellation rates for the remote retailer, especially as the total amount of the charges increases. In any event, once the consumer is on the phone with the customer service organization, the consumer has an easy opportunity to cancel the purchased goods or services. In addition, when all items are aggregated together in this manner, the consumer is more likely to cancel the entire order and request a refund of the total amount, rather than just canceling one or more individual items which make up the components of the total charge.

While many merchants offer installment and/or deferred billing plans, such conventional plans do not permit the merchant to separately bill a customer for each individual item purchased as part of a multiple-item order. In addition, such conventional installment and deferred billing plans do not stagger the billing of such individual items within an overall order, such that the smaller amount associated with each individual item indicated on the credit card billing statement will be interspersed with other purchases and thereby receive reduced scrutiny from the consumer.

As apparent from the above deficiencies with conventional credit card billing systems, a need exists for a credit card billing system which produces a credit card billing statement having improved billing information, thereby reducing the likelihood that a consumer will call the retailer for customer service purposes. A further need exists for a credit card billing system that permits a retailer to break up the total charge into individual line items for billing purposes, each having a description of the associated product and a different customer service number.

SUMMARY OF THE INVENTION

Generally, according to one aspect of the invention, a customer who purchases multiple cancelable items as part of a single transaction or order from a merchant will be separately billed on an account for each individual good or service in accordance with a payment schedule designed to minimize cancellation of the overall order by the customer. According to a further feature of the present invention, the billing descriptor which ultimately appears on the credit card billing statement of the customer will have sufficient detail to minimize the likelihood that the customer will subsequently contact the merchant to investigate the source of the charge. In one preferred embodiment, the billing descriptor will include a different customer service number for each individual item encouraging the customer to focus on individual understandable items instead of one amorphous bill.

A customer purchases a plurality of goods or services from a merchant in a conventional manner. As part of the transaction between the customer and the merchant, the customer will provide the merchant with a list of the multiple cancelable items included in the order, as well as credit card information. After the merchant has received an approval for the credit card purchase from the credit card issuer, the merchant will fulfill the order to the customer.

In accordance with a feature of the present invention, the merchant will preferably implement a charge cancellation reduction process to establish a staggered billing schedule for each item in the order. The established schedule is preferably stored in a billing schedule database. The cancellation reduction process permits multiple cancelable items purchased as part of a single order to be separately billed on a credit card. In one embodiment, the billing schedule delays billing of each item until at least one item is initially received by the customer and thereafter staggers the billing of each remaining item by a predefined period.

Thus, in order to receive payment for the purchased goods or services, the merchant transmits a charge request communication to a credit card issuer for each item, typically via a third party credit card processor, in accordance with the established billing schedule. The data transmitted by the merchant to the credit card issuer typically includes a merchant identification number, the detailed billing descriptor, customer credit card number, and the purchase amount. In one embodiment, the billing descriptor preferably includes an indication of the reference number associated with the customer's order, the name of the merchant, a detailed product descriptor identifying the individual item, and a customer service telephone number unique to the item.

Upon receipt of the charge information, the credit card issuer initially evaluates the credit card number to determine whether the received number is a valid number, and thereafter determines whether the purchase price is within the pre-established available credit limits for the customer's account. If the purchase price is within the pre-established available credit limit for a valid customer account, the credit card issuer then deducts the amount from the available credit limit, and transmits an authorization number back to the merchant, via the credit card processor. The credit card issuer will then initiate the transfer of the purchase amount, less a handling fee, to the pre-established merchant account at the merchant's bank.

A more complete understanding of the present invention, as well as further features and advantages of the present invention, will be obtained by reference to the following detailed description and drawings.

BRIEF DESCRIPTION OF DRAWINGS

FIG. 4 illustrates a sample table from the credit card customer database of FIG. 2;

FIG. 5 illustrates a sample table from the transaction database of FIG. 2;

FIG. 6 illustrates a sample table from the fulfillment database of FIG. 3;

FIG. 7 illustrates a sample table from the billing schedule database of FIG. 3;

DETAILED DESCRIPTION

Figure 1:
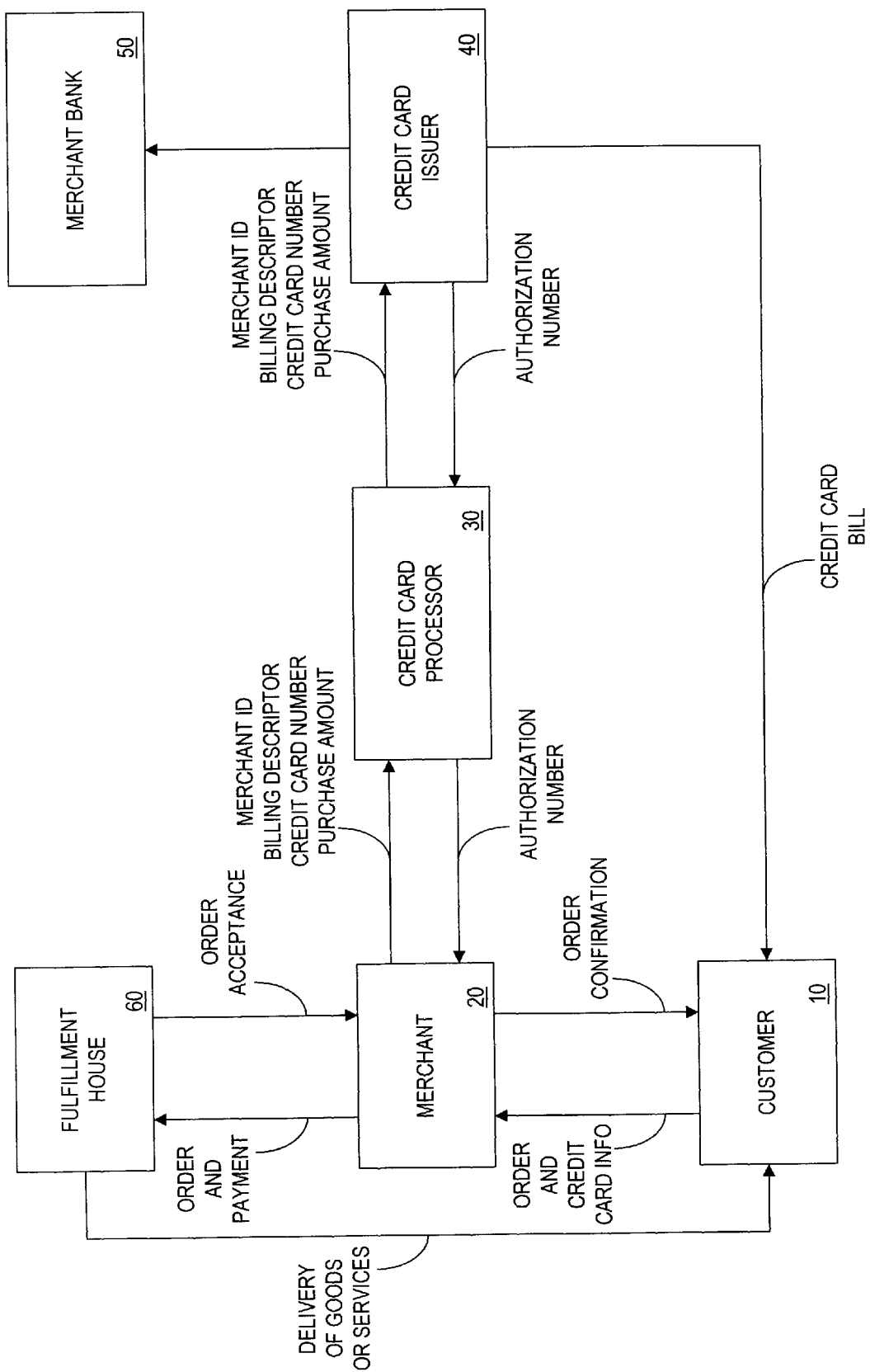
FIG. 1 is a schematic block diagram illustrating a suitable communications network for interconnecting the various parties participating in a retailing transaction.

FIG. 1 shows an illustrative network environment for transferring transactional information between the parties that typically participate in the purchase of goods or services, including a customer 10, a merchant 20, and one or more banks or credit card issuers, such as a merchant bank 50 and a credit card issuer 40. While the illustrative embodiment is described in the context of a remote retailing environment, it is noted that goods or services purchased in a traditional point-of-sale environment are within the scope of the present invention as well.

A remote retailing transaction, as used herein, is any transaction outside of the traditional point-of-sale environment. A remote retailing transaction includes purchases of goods or services, such as magazine subscriptions, membership services or catalog purchases, made by a customer 10 from a merchant 20, such as a direct merchant, remotely via, for example, telephone, mail, the Internet, or a shared revenue service, such as a 900 or a 976 telephone number service.

As shown in FIG. 1, a customer 10 purchases a plurality of goods or services from a merchant 20 in a conventional manner. As part of the transaction between the customer 10 and the merchant 20, the customer 10 will provide the merchant 20 with a list of the multiple cancelable items included in the order, as well as credit card information. After the merchant 20 has received an approval for the credit card purchase from the credit card issuer 40, in the manner described below, the merchant 20 will fulfill the order to the customer 10. It is noted that the merchant 20 can directly fulfill the order to the customer 10, by delivering the goods or services to the customer 10. Alternatively, the merchant 20 can indirectly fulfill the order to the customer 10, by using a third party fulfillment house 60 to deliver the goods or services to the customer 10, as shown in FIG. 1. When the order is fulfilled by a third party fulfillment house 60, the merchant 20 will typically only provide the customer 10 with a confirmation of the order.

As discussed further below in conjunction with FIGS. 9 through 11, a customer 10 who purchases multiple cancelable items as part of a single transaction or order from a merchant 20 will be separately billed on a credit card for each individual good or service in accordance with a payment schedule designed according to a feature of the present invention to minimize cancellation of the overall order by the customer 10. According to a further feature of the present invention, the billing descriptor which ultimately appears on the credit card billing statement of the customer 10 will have sufficient detail to minimize the likelihood that the customer 10 will subsequently contact the merchant 20 to investigate the source of the charge. In one preferred embodiment, the billing descriptor will include a different customer service number for each individual item so that the customer 10 cannot cancel the entire order with a single telephone call.

With respect to credit card processing of the individual purchased items, the merchant 20 and the credit card issuer 40, such as Citibank Visa, operate in a conventional manner, typically utilizing a third party credit card processor 30, such as First USA Paymentech of Salem, N.H. In order to receive payment for the purchased goods or services, the merchant 20 transmits a communication to the credit card issuer 40, via the credit card processor 30, as shown in FIG. 1. The merchant 20, credit card processor 30 and credit card issuer 40 transmit digitally encoded data and other information between one another. The communications link between the merchant 20, credit card processor 30 and credit card issuer 40 preferably comprises a cable or wireless link on which electronic signals can propagate.

The data transmitted by the merchant 20 to the credit card issuer 40 typically includes a merchant identification number, a billing descriptor, customer credit card number, and the purchase amount. As discussed further below, the billing descriptor preferably includes an indication of the reference number associated with the customer's order, the name of the merchant 20, a detailed product descriptor identifying the individual item, and a customer service telephone number. The credit card number identifies the type of credit card, the issuing bank, and the cardholder's account, in a known manner. Thus, based on the credit card number, the credit card processor 30 can identify the appropriate credit card issuer 40 to contact for authorization.

Upon receipt of the charge information, the credit card issuer 40 initially evaluates the credit card number to determine whether the received number is a valid number, and thereafter determines whether the purchase price is within the pre-established available credit limits for the customer's account. If the purchase price is within the pre-established available credit limit for a valid customer account, the credit card issuer 40 then deducts the amount from the available credit limit, and transmits an authorization number back to the merchant 20, via the credit card processor 30. The credit card issuer 40 will then initiate the transfer of the purchase amount, less a handling fee, to the pre-established merchant account at the merchant bank 50.

Figure 2:
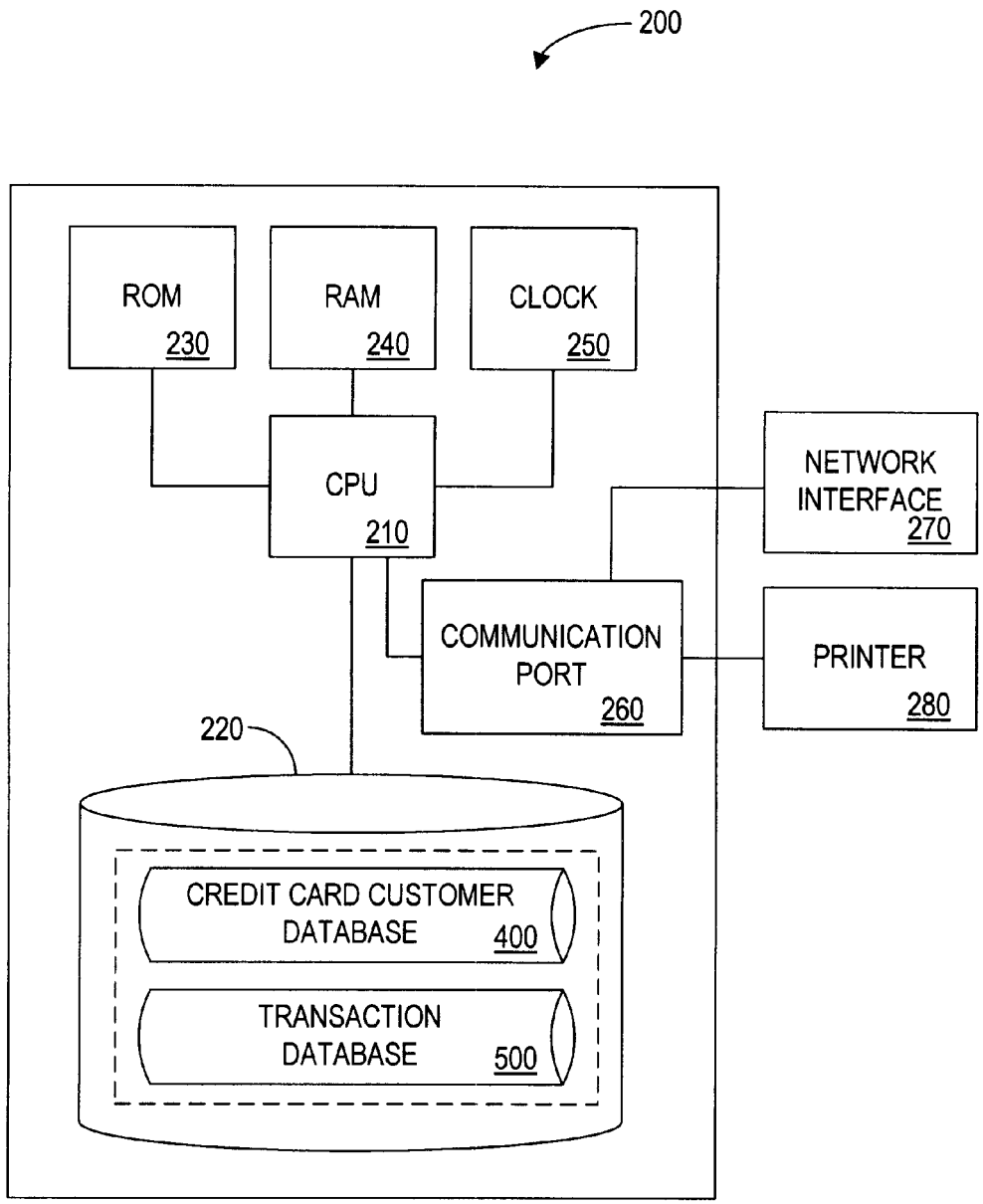
FIG. 2 is a schematic block diagram of a processor which may be utilized by the credit card issuer of FIG. 1.

FIG. 2 is a block diagram showing the architecture of an illustrative processor 200 which may be utilized by the credit card issuer 40. The processor 200 preferably includes certain standard hardware components, such as a central processing unit (CPU) 210, a data storage device 220, a read only memory (ROM) 230, a random access memory (RAM) 240, a clock 250, and a communications port 260. The CPU 210 is preferably linked to each of the other listed elements, either by means of a shared data bus, or dedicated connections, as shown in FIG. 2.

The CPU 210 may be embodied as a single processor, or a number of processors operating in parallel. The data storage device 220 and/or ROM 230 are operable to store one or more instructions, as discussed below in conjunction with FIGS. 9 through 11, which the CPU 210 is operable to retrieve, interpret and execute. The CPU 210 preferably includes a control unit, an arithmetic logic unit (ALU), and a CPU local memory storage device, such as, for example, a stackable cache or a plurality of registers, in a known manner. The control unit is operable to retrieve instructions from the data storage device 220 or ROM 230. The ALU is operable to perform a plurality of operations needed to carry out instructions. The CPU local memory storage device is operable to provide high speed storage used for storing temporary results and control information.

As discussed further below in conjunction with FIGS. 4 and 5, respectively, the data storage device 220 preferably includes a credit card customer database 400 and a transaction database 500. The credit card customer database 400 preferably stores biographical information on each customer, as well as the credit limit associated with each credit card account. The transaction database 500 preferably stores information required by the credit card issuer 40 for each transaction made by a customer 10, including the received billing descriptor and purchase amount for each item. The information stored in the transaction database 500 may be utilized by the credit card issuer 40 to generate the credit card billing statements.

The communications port 260 connects the credit card issuer 40 to a network interface 270, thereby linking the credit card issuer 40 to the merchant 20, via the credit card processor 30, and to one or more merchant banks 50. In addition, the communications port 260 may optionally connect the credit card issuer 40 to a printer 280, which may be utilized, among other things, to print credit card billing statements. The communications port 260 preferably includes multiple communication channels for simultaneously connecting the credit card issuer 40 with multiple parties.

Figure 3:
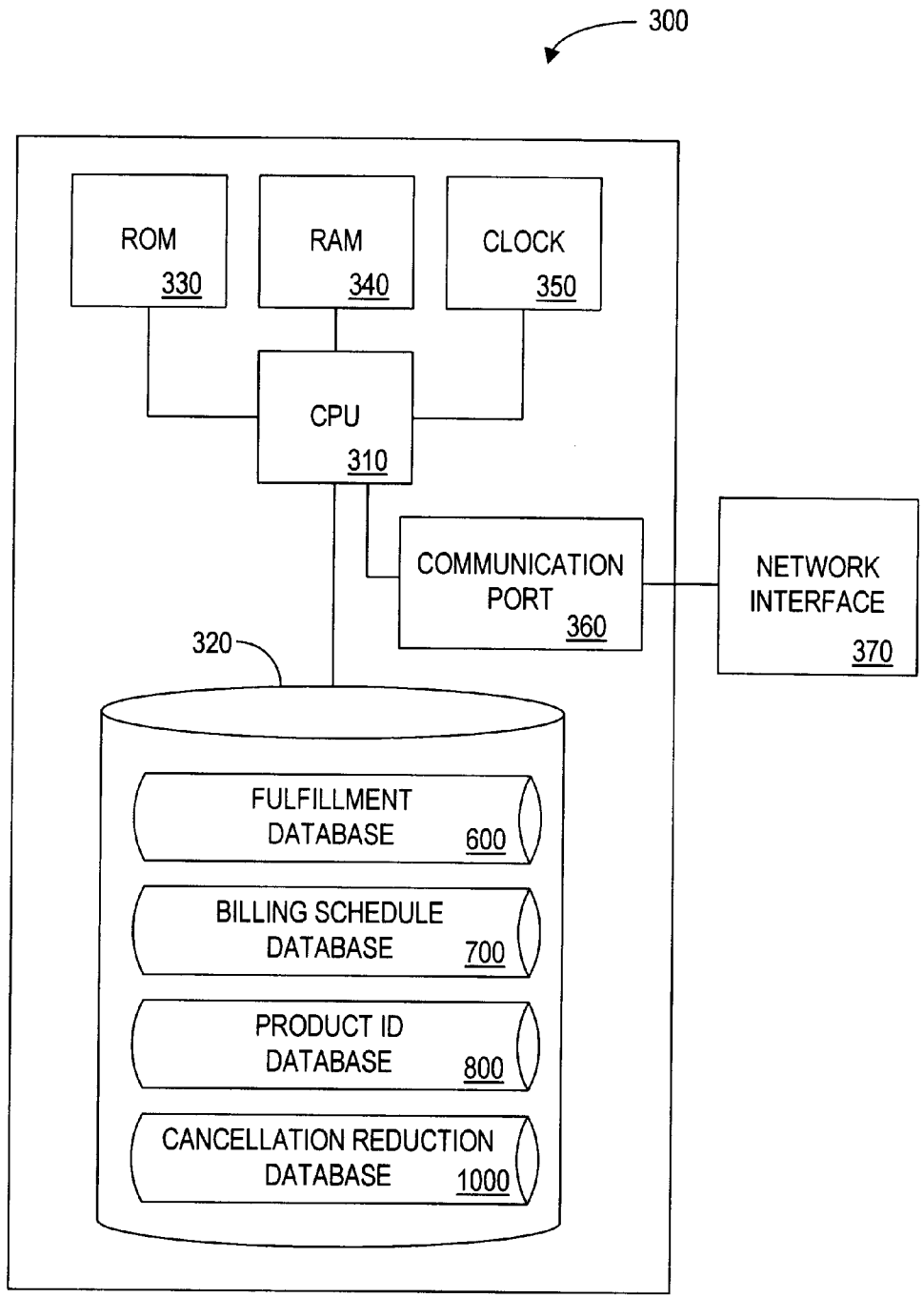
FIG. 3 is a schematic block diagram of a processor which may be utilized by the merchant of FIG. 1.

FIG. 3 is a block diagram showing the architecture of an illustrative processor 300 which may be utilized by the merchant 20. The processor 300 preferably includes certain standard hardware components, such as a central processing unit (CPU) 310, a data storage device 320, a read only memory (ROM) 330, a random access memory (RAM) 340, a clock 350, and a communications port 360. The CPU 310 is preferably linked to each of the other listed elements, either by means of a shared data bus, or dedicated connections, as shown in FIG. 3.

The CPU 310 may be embodied as a single processor, or a number of processors operating in parallel, in the manner described above for the CPU 210 in conjunction with FIG. 2. The data storage device 320 and/or ROM 330 are operable to store one or more instructions, as discussed below in conjunction with FIGS. 9 through 11, which the CPU 310 is operable to retrieve, interpret and execute. As discussed further below in conjunction with FIGS. 6 through 8 and FIG. 10, respectively, the data storage device 320 preferably includes a fulfillment database 600, a billing schedule database 700, a product identification database 800 and a cancellation reduction process 1000. The fulfillment database 600 preferably stores information on each order received by the merchant 20, including the billing terms associated with each order. The billing schedule database 700 preferably stores the billing schedule used by the merchant 20 to stagger the billing for each item included within a given order, in accordance with the present invention. The product identification database 800 preferably stores information on each product sold by the merchant 20, including a description and cost for each product.

The communications port 360 connects the merchant 20 to a network interface 370, thereby linking the merchant 20 to the credit card issuer 40, via the credit card processor 30. The communications port 360 preferably includes multiple communication channels for simultaneously connecting the merchant 20 with multiple parties.

As previously indicated, the credit card customer database 400, shown in FIG. 4, preferably stores biographical information on each customer account maintained by the credit card issuer 40, as well as the credit limit associated with each credit card account. The credit card customer database 400 maintains a plurality of records, such as records 410–413, each associated with a different credit card customer. For each customer credit card number listed in field 420, the credit card customer database 400 includes the name and address of the customer in fields 425 and 430, respectively. In addition, the credit card customer database 400 preferably includes an indication of the card expiration date in field 435 and an indication of the credit limit associated with the account in field 440.

As previously indicated, the transaction database 500, shown in FIG. 5, preferably stores information required by the credit card issuer 40 for each transaction made by a customer 10 using their credit card account, including the received billing descriptor and purchase amount for each purchase. The transaction database 500 maintains a plurality of records, such as records 510–513, each associated with a different credit card transaction. For each transaction, the transaction database 500 preferably stores the date, time, credit card number and order reference number associated with the transaction in fields 520, 525, 530 and 535, respectively. In addition, the transaction database 500 includes the billing descriptor, merchant identification code and purchase amount associated with the transaction in fields 540, 545 and 550, respectively, as received from the merchant 20. Finally, the transaction database 500 includes an indication of the authorization code in field 555 which the credit card issuer 40 has generated for the transaction and transmitted to the merchant 20. The credit card issuer 40 can sort the transaction database 500 by credit card number, in order to generate the credit card billing statements.

In accordance with a feature of the present invention, the billing descriptor stored in field 540, as received from the merchant 20, may be customized and of sufficient detail to reduce the likelihood that the customer will contact the merchant 20 to question the source of the charge. In addition, the billing descriptor preferably includes an indication of the reference number associated with the customer's order, the name of the merchant 20, a detailed product descriptor identifying the individual item, and a customer service telephone number. In one preferred embodiment, the billing descriptor will include a different customer service number for each individual item so that the customer 10 cannot cancel the entire order with a single telephone call.

As previously indicated, the fulfillment database 600, shown in FIG. 6, preferably stores information on each order received by the merchant 20, including the billing terms associated with each order. The fulfillment database 600 maintains a plurality of records, such as records 610–613, each associated with a different item of each multi-item purchase order. The fulfillment database 600 preferably stores the order reference number associated with each item, as well as the order date, customer name and address, credit card number and related expiration date, associated with each item in fields 620, 625, 630, 635, 640 and 645, respectively. In addition, the fulfillment database 600 preferably stores the authorization code received back from the credit card issuer 40 in field 650. Finally, the fulfillment database 600 preferably stores a product description of each item in field 655, and the billing terms and renewal date, if applicable, in fields 660 and 665. Thus, the fulfillment database 600 maintains any information required by the merchant 20 to respond to customer service inquiries.

The billing terms stored in the fulfillment database 600 may include an indication of the amount and frequency of each installment payment to be charged for each item. The renewal date, if applicable, is preferably based on the initial anticipated delivery date of the goods or services. In this manner, the renewal date may be utilized to renew any continuous subscription-based goods or services until canceled by the customer 10 and to initiate the establishment of an appropriate staggered billing schedule for payments associated with such renewal periods, as would be apparent to a person of ordinary skill.

As previously indicated, the billing schedule database 700, shown in FIG. 7, preferably stores the billing schedule used by the merchant 20 to stagger the billing for each item included within a given order, in accordance with principles of the present invention. The billing schedule database 700 maintains a plurality of records, such as records 710–713, each associated with a different billing transaction. In a preferred embodiment, each billing transaction corresponds to one item, or installment payment of an item, of a multi-item purchase order. The billing schedule database 700 is preferably indexed by the scheduled authorization date of each billing transaction listed in field 720. For each billing transaction listed in field 720, the billing schedule database 700 preferably records the associated order reference number, order date, customer name and address, credit card number and related expiration date and amount associated with each billing transaction in fields 725, 730, 735, 740, 745, 750 and 755, respectively.

In addition, the billing schedule database 700 preferably records a detailed billing descriptor in field 760 which should be transmitted to the credit card issuer 40 with the authorization request for printing on the customer's credit card billing statement. As previously indicated, the billing descriptor preferably includes an indication of the reference number associated with the customer's order, the name of the merchant 20, a detailed product descriptor identifying the individual item, and a customer service telephone number that is unique for each item. Finally, the billing schedule database 700 preferably stores the authorization code in field 765 for verification purposes that is received back from the credit card issuer 40.

Figure 8:
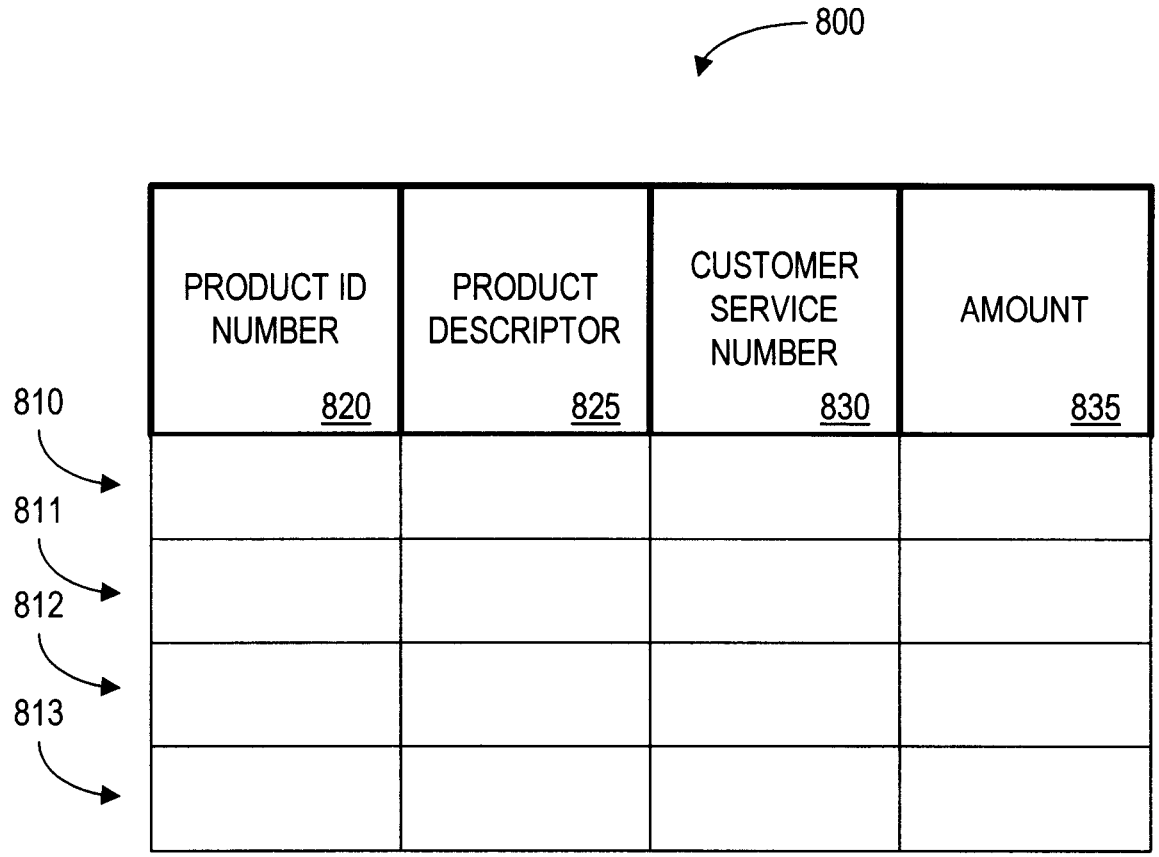
FIG. 8 illustrates a sample table from the product identification database of FIG. 3.

As previously indicated, the product identification database 800, shown in FIG. 8, preferably stores information on each product sold by the merchant 20, including a description and cost for each product. The product identification database 800 maintains a plurality of records 810-813, each associated with a different product sold by the merchant 20. For each product sold by the merchant 20, identified by product identification number in field 820, the product identification database 800 preferably stores a product descriptor, a customer service number and an amount or cost of the product in fields 825, 830 and 835, respectively. It is noted that a merchant 20 can implement a different cost for a particular product as part of two different marketing campaigns by assigning two different product identification numbers to the product, each having a different associated amount or cost.

The product descriptors and customer service numbers are preferably utilized by the merchant 20 to construct the billing descriptors. As previously indicated, the billing descriptors may be customized by the merchant 20 and of sufficient detail to reduce the likelihood that a customer 10 will subsequently contact the merchant 20 to question the source of the charge. In addition, as previously indicated, a different customer service number is preferably utilized by the merchant 20 for each individual item purchased by a customer 10 so that the customer 10 cannot cancel the entire order with a single telephone call.

As discussed further below in conjunction with FIGS. 9 through 11, the processes performed in accordance with the present invention permit a customer 10 who purchases multiple cancelable items as part of a single transaction or order from a merchant 20 to be separately billed for each individual good or service, in accordance with a payment schedule designed to minimize cancellation of the overall order by the customer 10. In addition, the present invention permits the billing descriptor associated with the charge which appears on the credit card billing statement of the customer 10 to provide sufficient detail to minimize the likelihood that the customer 10 will contact the merchant 20 to investigate the source of the charge. In one preferred embodiment, the billing descriptor will include a different customer service number for each individual item so that the customer 10 cannot cancel the entire order with a single telephone call.

Figure 9:
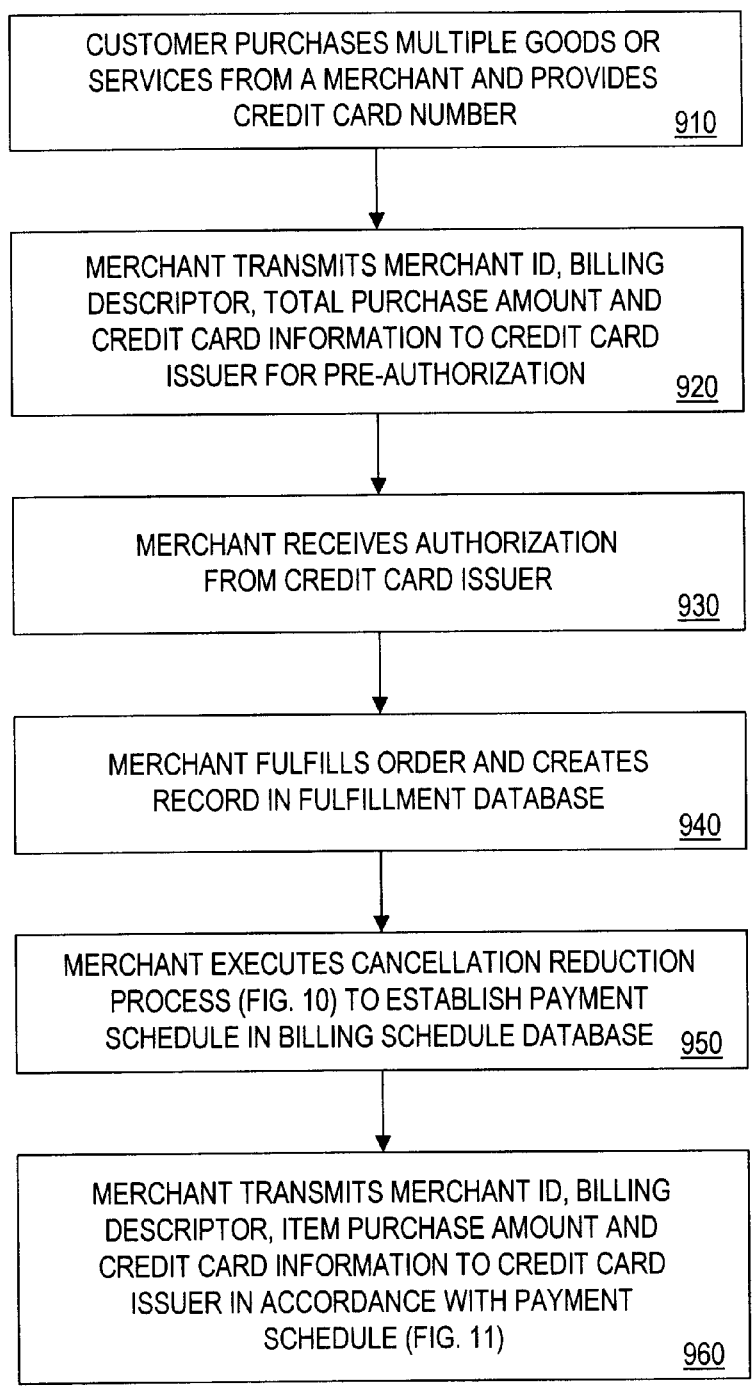
FIG. 9 is a flow chart describing an overview of exemplary processes according to the present invention.

As illustrated in FIG. 9, the processes embodying the principles of the present invention will begin during step 910, when a customer, such as the customer 10, purchases multiple goods or services from a remote merchant and provides a credit card number as a method of payment. It is noted that the purchase may be part of a traditional point-of-sale transaction, wherein the customer 10 and merchant 20 may communicate face-to-face, or a remote retailing transaction. Thereafter, during step 920, the merchant 20 will transmit its merchant identification number, billing descriptor, total purchase amount and credit card information to the credit card issuer 40 for pre-authorization. It is noted that the total amount of the entire order is preferably submitted for pre-authorization with a generic billing descriptor generally identifying all of the items included in the order.

After the merchant 20 receives an appropriate authorization during step 930 from the credit card issuer 40, the merchant 20 will preferably fulfill the entire order during step 940 and create a record of the order in the fulfillment database 600, in the manner described above in conjunction with FIG. 6. The merchant 20 will preferably place the authorization code received during step 930 in the entry in field 650 for each item in the current order.

As discussed further below in conjunction with FIGS. 10A through 10B, the merchant 20 will preferably execute a cancellation reduction process 1000 during step 950 to establish a payment schedule for each item in the order. The payment schedule established during step 950 is preferably stored in the billing schedule database 700 (FIG. 7). As previously indicated, the cancellation reduction process 1000 permits a customer 10 who purchases multiple cancelable items as part of a single transaction or order from a merchant 20 to be separately billed on a credit card for each individual good or service in accordance with a payment schedule designed to minimize cancellation of the overall order by the customer 10.

Finally, as discussed below in conjunction with FIG. 11, the merchant will execute a billing process during step 960 to facilitate the transmission of its merchant identification number, billing descriptor, item purchase amount and credit card information to the credit card issuer 40 for each individual item in the billing schedule database 700 in accordance with the payment schedule established during the previous step.

Figure 10A:
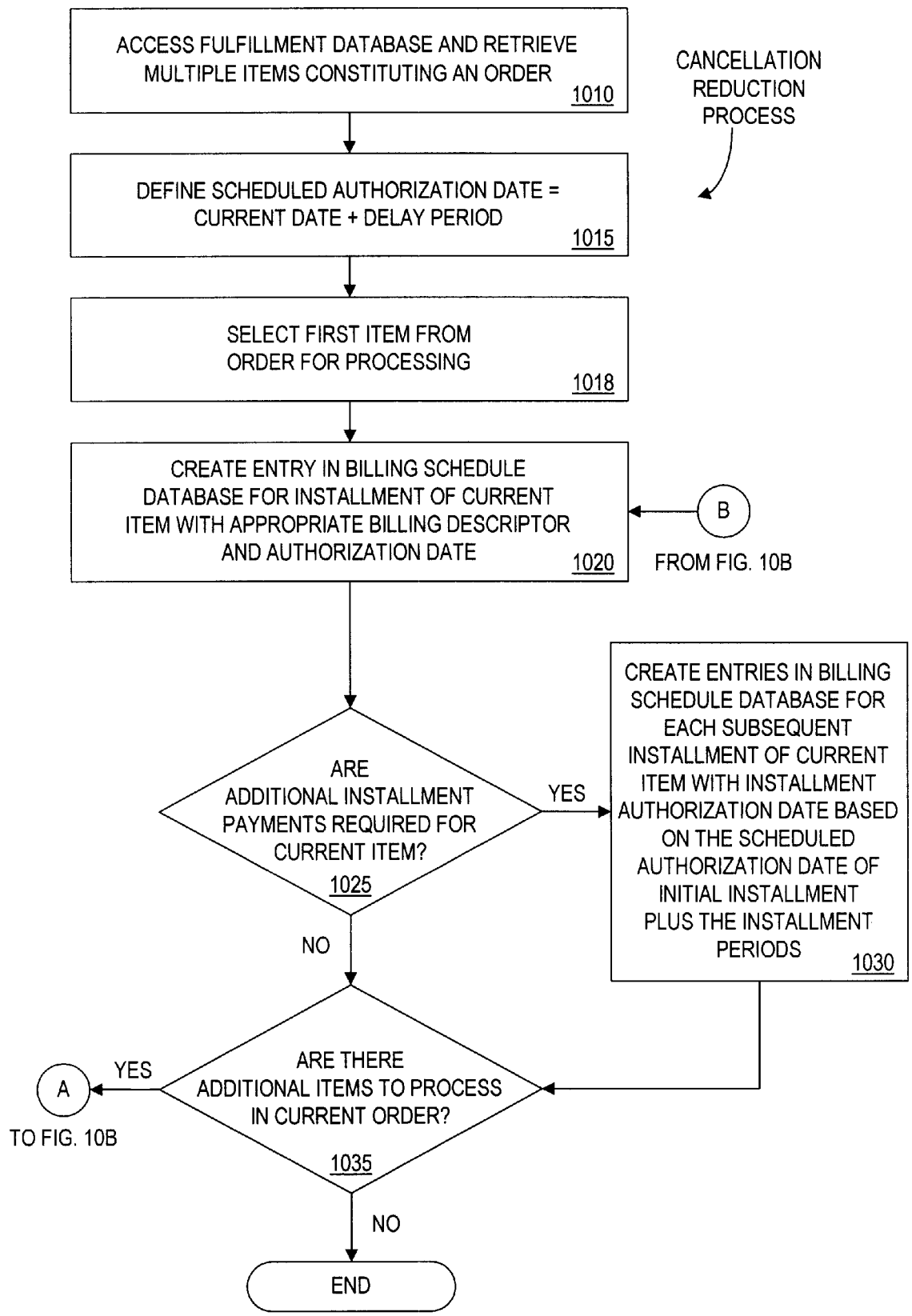
FIGS. 10A and 10B, collectively, are a flow chart describing an exemplary cancellation reduction process.
Figure 10B:
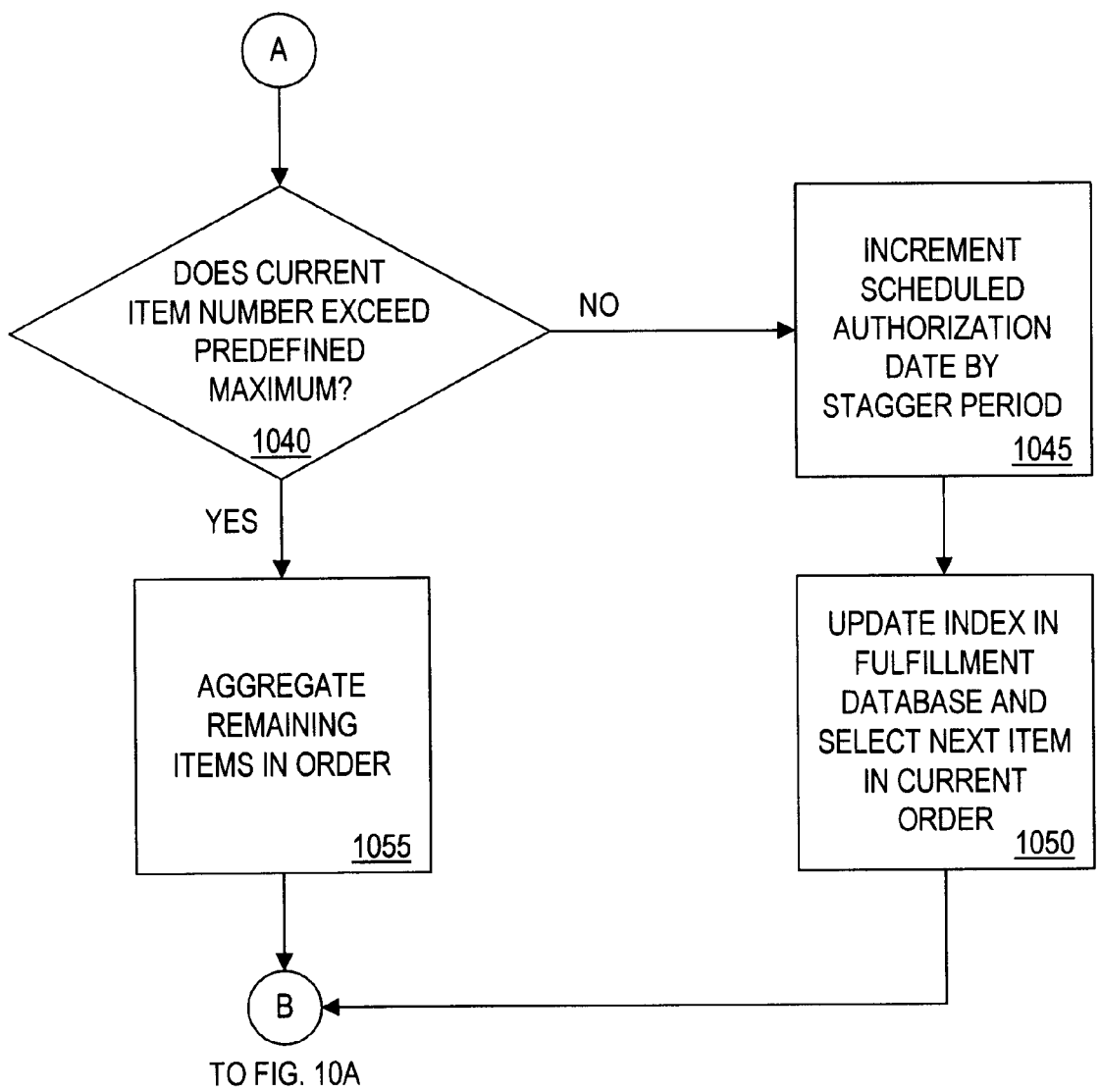

As previously indicated, the merchant 20 will preferably execute a cancellation reduction process 1000, shown in FIGS. 10A through 10B, to establish a payment schedule for each item in a given order. As shown in FIG. 10A, the merchant 20 will initially access the fulfillment database 600 during step 1010 and retrieve the multiple items constituting a given order. Thereafter, the merchant 20 will define a variable, scheduled authorization date, during step 1015 to be equal to the current date plus a predefined delay period. In this manner, if desired, the merchant 20 can ensure that a customer 10 is not billed for the transaction until at least a portion of the purchased goods or services are received. Thereafter, the merchant 20 will select the first item from the order for processing during step 1018.

The merchant 20 will create an entry in the billing schedule database 700, during step 1020, for an installment payment of the current item of the given order. Thus, an appropriate billing descriptor, constructed based on information retrieved from the product identification database 800, in the manner described above, is placed in the entry in field 760 of the billing schedule database 700 and the current value of the variable, scheduled authorization date, is placed in the entry in field 720.

A test is performed during step 1025 to determine whether additional installment payments are required for the current item. For example, the merchant 20 can access the billing terms stored in field 660 of the fulfillment database 600 to determine if the current item should be billed on an installment basis.

If it is determined during step 1025 that additional installment payments are required for the current item, then the merchant 20 will preferably create additional entries in the billing schedule database 700 for each further required installment payment (step 1030). Specifically, the additional entries associated with each further required installment payment will have an appropriate billing descriptor placed in the entry in field 760 and a scheduled authorization date placed in the entry in field 720 equal to the current value of the variable, scheduled authorization date, plus an appropriate offset, based on the installment periods. It is noted that it may be desirable to establish a different customer service number for subsequent installment payments than was associated with the initial installment, so that special handling, tailored to the installment number, may be implemented upon a customer inquiry to the customer service number.

If, however, it is determined during step 1025 that additional installment payments are not required for the current item, then program control will proceed to step 1035. A test is performed during step 1035 to determine if there are additional items to be processed in the current order.

If it is determined during step 1035 that there are additional items to be processed in the current order, then program control will proceed to step 1040 (FIG. 10B) for processing of the subsequent items. If, however, it is determined during step 1035 that there are no additional items to be processed in the current order, then program control will terminate.

A further test is performed during step 1040 to determine if the current item number, within the total number of items in the given order, exceeds a predefined number. As discussed further below in conjunction with step 1055, the test performed during step 1040 is designed to ensure that the overall billing period stays within a predefined limit.

If it is determined during step 1040 that the current item number does not exceed the predefined minimum number, then the process will continue processing the next item in the current order. Thus, the variable, scheduled authorization date, will be incremented during step 1045 by the value of a second variable, stagger period. The variable, stagger period, is intended to separate billing of each item within the order by a predefined period. Thereafter, the merchant 20 will update the index in the fulfillment database during step 1050 to retrieve the next item in the current order from the fulfillment database 600 for processing. Program control will then return to step 1020 for processing of the next item, in the manner described above.

If, however, it is determined during step 1040 that the current item number does exceed the predefined minimum number, then the merchant 20 will limit the overall billing period for which items associated with a given order may be billed during step 1055 or otherwise prevent a customer 10 from taking advantage of the staggered billing process when an unusually large number of items are purchased. In particular, the merchant 20 may desire to limit the number of items which may have staggered billing so that billing for all items is completed within a predefined period. For example, if a merchant defines the variable, delay period, to be 60 days to ensure that the first item is not billed until the first item is actually received by the customer 10, and defines the variable, stagger period, to be 10 days to ensure that the bill for each item on the customer's credit card billing statement is separated by 10 days, then if a particular customer purchases 8 or more items, then item number 8 will not be billed for 140 days.

Thus, in order to ensure that the overall billing period stays within desired limits, the merchant may desire to aggregate all remaining items during step 1055 for billing as a single transaction. Alternatively, when a large number of items are purchased by a customer as part of a single order, the merchant 20 may desire to reduce the value of one or both of the variables, delay period or stagger period, so that the overall billing period stays within desired limits.

In the illustrative embodiment, the credit card processor 30 will thus aggregate all of the remaining items, above the predefined minimum number, during step 1055 for billing in one billing transaction. Program control will then return to step 1020 for processing of this final aggregated item, in the manner described above.

As previously indicated, the merchant 20 will execute a billing process during step 960 of the overall process to facilitate the transmission of its merchant identification number, billing descriptor, item purchase amount and credit card information to the credit card issuer 40 for each individual item in the billing schedule database 700 in accordance with the established payment schedule.

Figure 11:
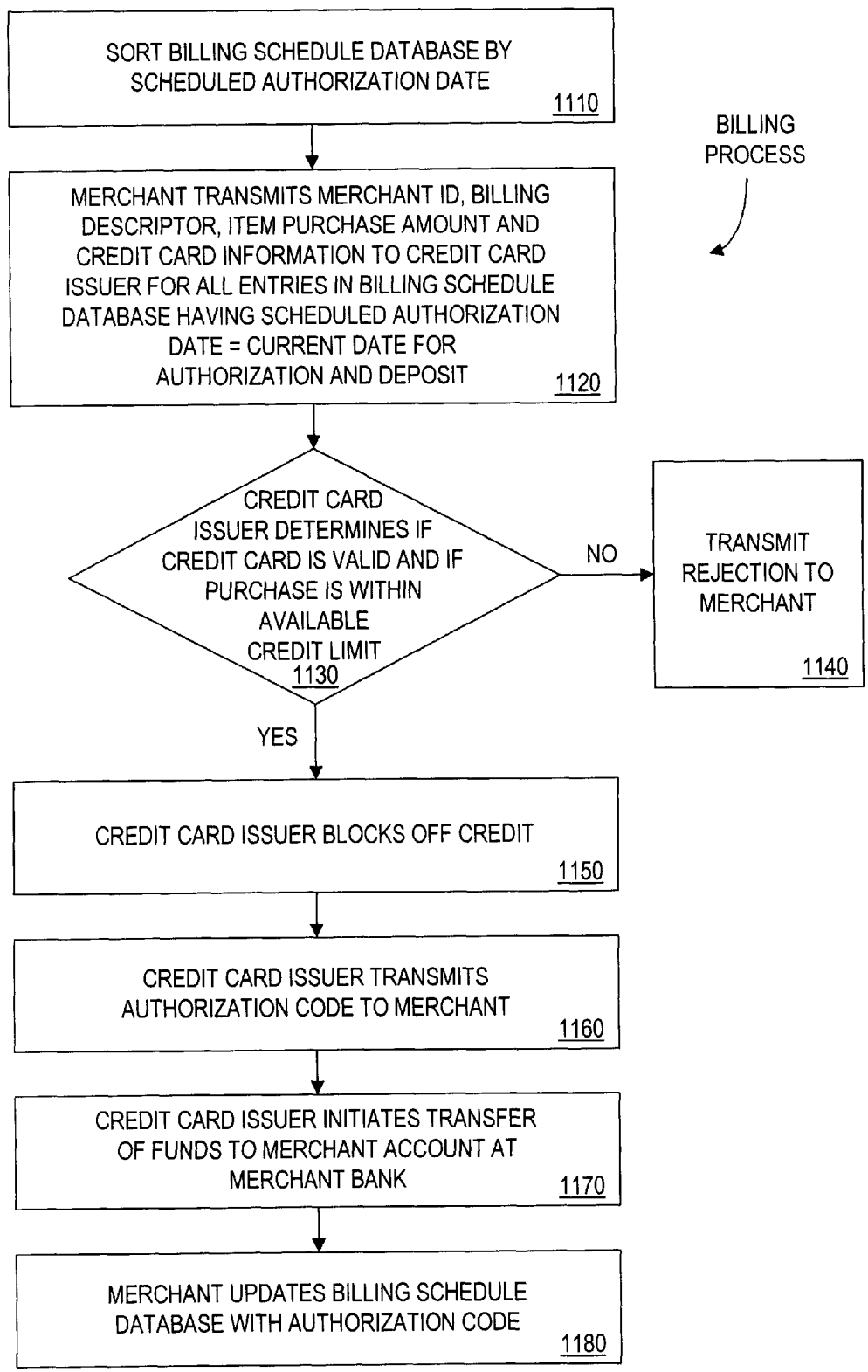
FIG. 11 is a flow chart describing an exemplary billing process.

As shown in FIG. 11, the merchant 20 will preferably sort the billing schedule database 700 during step 1110, by the scheduled authorization date field. In this manner, all of the billing items to be processed on each day will appear together. Thereafter, the merchant will transmit its merchant identification code, billing descriptor, item purchase amount and credit card information to the credit card issuer 40 for all entries in the sorted billing schedule database 700 having a scheduled authorization date equal to the current date.

A test is then performed during step 1130 by the credit card issuer 40 to determine if the credit card number is valid and if the purchase amount is within the available credit limit associated with indicated account. If it is determined during step 1130 that the purchase amount is not within the available credit limit associated with a valid indicated account, a rejection of the transaction will be transmitted by the credit card issuer 40 during step 1140 to the merchant 20.

If, however, it is determined during step 1130 that the purchase amount is within the available credit limit associated with a valid indicated account, the credit card issuer 40 will block off the credit in the account during step 1150 and transmit an authorization code to the merchant 20 during step 1160. The credit card issuer 40 will thereafter initiate a transfer of the purchase amount, less a handling fee, during step 1170 to an account associated with the merchant 20 at the merchant bank 50. Finally, the merchant 20 will update the entry in field 765 of the billing schedule database 700 for the current item during step 1180 with the authorization code received from the credit card issuer 40 during step 1160.

It is to be understood that the embodiments and variations shown and described herein are merely illustrative of the principles of this invention and that various modifications may be implemented by those skilled in the art without departing from the scope and spirit of the invention.

We claim:

1. A method of processing a plurality of charges to an account for a purchase by a customer of a plurality of items during a single transaction, said method performed over a communications network and comprising the steps of:

receiving an authorization request from a merchant to allocate a block of credit associated with said account for a total cost corresponding to said purchase;

providing said merchant with an authorization code for said purchase in response to said authorization request;

receiving a plurality of charge requests from said merchant, each of said charge requests associated with a different one of said plurality of items of said purchase;

generating an account statement for said customer separately listing each of said charge requests associated with one of said items; and transmitting said account statement to said customer.

2. The method according to claim 1, wherein said authorization request is at least equal to the total cost of said purchase.

3. The method according to claim 1, further comprising the step of receiving a product descriptor associated with each of said charge requests and wherein said step of generating an account statement includes the step of printing said product descriptor associated with each of said items.

4. The method according to claim 1, further comprising the step of transferring the cost of said purchase to an account associated with said merchant less any handling fee.

5. The method according to claim 1, wherein said plurality of charge requests each include an identifier for said account, a purchase price for said item, and a merchant identifier.

6. The method according to claim 1, wherein said plurality of charge requests are staggered by a predefined period.

7. The method according to claim 1, further comprising the step of fulfilling said purchase when said merchant receives said authorization code.

8. The method according to claim 1, wherein said step of receiving a plurality of charge requests is delayed at least until said customer has received at least one of said items of said purchase.

9. The method according to claim 1, wherein said step of receiving said plurality of charge requests comprises receiving said plurality of charge requests for said one or more of said items of said purchase in accordance with an installment payment schedule established by said merchant.

10. The method according to claim 1, wherein said step of receiving said plurality of charge requests is performed in accordance with a schedule, established by said merchant, to separately bill said customer for each of said items of said purchase.

11. A device for processing over a communication network, a plurality of charges to an account for a purchase by a customer of a plurality of items during a single transaction, the device comprising:

a storage device; and a processor connected to the storage device;

the storage device storing a program for controlling the processor; and the processor operative with the program to:

receive an authorization request from a merchant to allocate a block of credit associated with said account for a total cost corresponding to said purchase;

provide said merchant with an authorization code for said purchase in response to said authorization request;

receive a plurality of charge requests from said merchant, each of said charge requests associated with a different one of said plurality of items of said purchase;

generate an account statement for said customer separately listing each of said charge requests associated with one of said items; and transmit said account statement to said customer.

12. The device according to claim 11, wherein said authorization request is at least equal to the total cost of said purchase.

13. The device according to claim 11, wherein the processor is further operative to receive a product descriptor with each of said charge requests and wherein the account statement includes said product descriptor associated with each of said items.

14. The device according to claim 11, wherein the processor is further operative to transfer the cost of said purchase to an account associated with said merchant less any handling fee.

15. The device according to claim 11, wherein said plurality of charge requests each include an identifier for said account, a purchase price for said item, and a merchant identifier.

16. The device according to claim 11, wherein said plurality of charge requests are staggered by a predefined period.

17. The device according to claim 11, wherein receipt of said plurality of charge requests is delayed at least until said customer has received at least one of said items of said purchase.

18. The device according to claim 11, wherein receipt of said plurality of charge requests is scheduled in accordance with an installment payment schedule established by said merchant.

* * * * *